(12) United States Patent
Moore et al.

(10) Patent No.: US 9,905,109 B2
(45) Date of Patent: Feb. 27, 2018

(54) RETROACTIVE MESSAGING FOR HANDLING MISSED SYNCHRONIZATION EVENTS

(71) Applicant: Google Inc., Mountain View, CA (US)

(72) Inventors: Tyler Moore, San Francisco, CA (US); Fang Wang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 76 days.

(21) Appl. No.: 15/171,259

(22) Filed: Jun. 2, 2016

(65) Prior Publication Data
US 2017/0352244 A1 Dec. 7, 2017

(51) Int. Cl.
| | |
|---|---|
| G08B 21/18 | (2006.01) |
| H04W 56/00 | (2009.01) |
| H04W 68/02 | (2009.01) |
| H04W 4/00 | (2018.01) |
| H04W 76/02 | (2009.01) |
| G08B 17/00 | (2006.01) |
| H04W 88/02 | (2009.01) |
| H04W 88/08 | (2009.01) |

(52) U.S. Cl.
CPC ............ *G08B 21/18* (2013.01); *G08B 17/00* (2013.01); *H04W 4/005* (2013.01); *H04W 56/001* (2013.01); *H04W 68/02* (2013.01); *H04W 76/02* (2013.01); *H04W 88/02* (2013.01); *H04W 88/08* (2013.01)

(58) Field of Classification Search
CPC ....... G08B 21/18; G08B 17/00; H04W 4/005; H04W 56/001; H04W 68/02; H04W 76/02; H04W 88/02; H04W 88/08
See application file for complete search history.

(56) References Cited

U.S. PATENT DOCUMENTS

| | | | | |
|---|---|---|---|---|
| 2003/0055768 A1* | 3/2003 | Anaya | ................... | G06Q 40/06 705/36 R |
| 2006/0145842 A1* | 7/2006 | Stilp | ....................... | G05B 9/03 340/539.22 |
| 2008/0071899 A1* | 3/2008 | Odaka | .................... | H04L 41/06 709/223 |

(Continued)

*Primary Examiner* — An T Nguyen
(74) *Attorney, Agent, or Firm* — Kilpatrick Townsend & Stockton LLP

(57) ABSTRACT

Various arrangements for handling delayed status update are presented. A network-enabled sensor unit may be used to measure an environmental condition. The sensor unit may determine, based on measuring the environmental condition, an environmental condition status has changed state. A network connection may be established that permits communication with a remote notification service system. This notification service system may maintain a remote status intended to be synchronized with the environmental condition status of the sensor unit. The sensor unit may determine that the environmental condition status has changed prior to communicating the environmental condition status to the notification service system. A historical status array may be transmitted to the notification service system in response to determining the environmental condition status has reverted to the first state prior to communicating the environmental condition status. The historical status array can indicate previous states of the environmental condition status of the sensor unit.

20 Claims, 11 Drawing Sheets

(56) References Cited

U.S. PATENT DOCUMENTS

2010/0262664 A1* 10/2010 Brown ................. H04L 47/323
  709/206
2010/0315242 A1* 12/2010 Bullard ................ H04L 43/065
  340/584
2013/0278427 A1* 10/2013 Setton ................... G08B 21/12
  340/584
2013/0340500 A1* 12/2013 Miller .................... G01N 25/56
  73/29.02

* cited by examiner

300A

| Timestamp (UTC Seconds) | State | Synchronized? |
|---|---|---|
| 1441101200 | 2 | N |
| 1441201200 | 3 | N |
| 1441322000 | 0 | Y |

| Wireless Sensor Unit ID | State | Synchronized? | Timestamp | CO Status History | Smoke Status History |
|---|---|---|---|---|---|
| 349AF3B034 | 2 | N | 20349834 | (Data Array) | (Data Array) |

FIG. 3B

RETROACTIVE MESSAGING FOR HANDLING MISSED SYNCHRONIZATION EVENTS

BACKGROUND

Smart devices, including sensor devices, that communicate over network connections are becoming commonplace. With such smart devices, a user can receive information from and about the smart device on a separate user device via a network connection. For instance, while a user is away from home, the user may receive information collected by a smart device located at the user's home via his cellular phone. While smart devices can provide a user with useful information, smart devices are typically dependent on a network connection being present to enable communication between the smart device, a server system, and/or a user device. If the network connection is not available, it may not be possible for information to be sent from the smart device to a server system which can then relay information to the user device. As such, in some circumstances, a user may expect to receive information from a smart device, but such information may never be delivered due to a period of time when the network connection was not available to the smart device.

SUMMARY

Various arrangements for handing a delayed status update are detailed herein. In some embodiments, a method for handling a delayed status update is presented. The method may include measuring, by a network-enabled sensor unit, an environmental condition. The method may include determining, by the network-enabled sensor unit, based on measuring the environmental condition, an environmental condition status has changed from a first state to a second state. The method may include establishing a network connection that permits communication with a notification service system in response to determining the environmental condition status has changed. The notification service system may maintain a remote environmental condition status to be synchronized with the environmental condition status of the network-enabled sensor unit. The method may include determining, by the network-enabled sensor unit, the environmental condition status has reverted to the first state prior to communicating the environmental condition status to the notification service system via the established network connection. The method may include transmitting, by the network-enabled sensor unit, a historical status array to the notification service system via the established network connection in response to determining the environmental condition status has reverted to the first state prior to communicating the environmental condition status to the notification service system. The historical status array may indicate one or more previous states of the environmental condition status of the network-enabled sensor unit. The remote environmental condition status may remain unchanged at the notification service system.

Embodiments of such a method may include one or more of the following features: The method may include determining, by the network-enabled sensor unit, an amount of time that has elapsed between determining the environmental condition status has changed from the first state to the second state and the network connection being established. The method may include comparing, by the network-enabled sensor unit, the determined amount of time with a stored threshold amount of time. Transmitting the historical status array to the notification service system may be contingent on the determined amount of time not exceeding the stored threshold amount of time. The method may include parsing, by the notification service system, the transmitted historical status array to analyze the one or more previous states of the environmental condition status of the network-enabled sensor unit. The method may include determining, by the notification service system, based on parsing the historical status array, to transmit a user notification indicative of the environmental condition. The method may include accessing, by the notification service system, a database that links a user device with the network-enabled sensor unit. The method may include causing, by the notification service system, a notification to be transmitted to the user device indicative of the environmental condition. The notification may be a push notification and the user device is a cellular telephone, the push notification being transmitted to the user device without a request having been sent from the user device to the notification service system. The method may include broadcasting, by the network-enabled sensor unit, a message indicative of the second state via a local wireless communication protocol distinct from a protocol used for the network connection. The method may include receiving, by the notification service system, a suppression message from a user device associated with the network-enabled sensor unit. The method may include, in response to the suppression message, suppressing transmission of a notification to the user device based on parsing of the historical status array. The environmental condition that is measured may be an amount of smoke or an amount of carbon monoxide. The network-enabled sensor unit may be exclusively battery powered. The method may include periodically establishing, by the network-enabled sensor unit, the network connection that permits communication with the notification service system absent the environmental condition status changing.

In some embodiments, a system for handling a delayed status update is presented. The system may include a network-enabled wireless unit that includes a wireless network interface, one or more processors, and a memory. The memory may be communicatively coupled with and readable by the one or more processors. The memory may have stored therein processor-readable instructions which, when executed by the one or more processors, cause the one or more processors to determine a local status has changed from a first state to a second state, wherein the local status is maintained at the network-enabled wireless unit. The instructions may cause the one or more processors to establish a network connection that permits communication with a notification service system in response to determining the local status has changed. The notification service system may maintain a remote status to be synchronized with the local status of the network-enabled wireless unit. The instructions may cause the one or more processors to determine the local status has changed prior to synchronization with the notification service system via the established network connection. The instructions may cause the one or more processors to transfer, via the wireless network interface and the established network connection, a historical status array to the notification service system in response to determining the local status has changed prior to synchronization. The historical status array may indicate one or more previous states of the local status of the network-enabled wireless unit. The remote status may remain unchanged at the notification service system.

Embodiments of such a system may include one or more of the following features: The system may include the notification service system accessible by the network-enabled wireless unit via the network connection. The notification service may be configured to determine, based on parsing the historical status array, to transmit a user notification indicative of the second state. The notification service may be configured to access a database that links a user device with the network-enabled wireless unit. The notification service may be configured to transmit a notification to the user device indicative of the second state. The notification service may be configured to process a received suppression message from a user device associated with the network-enabled wireless unit. The notification service may be configured to, in response to the received suppression message, suppress transmission of a notification to the user device based on an analysis of the historical status array. The network-enabled wireless unit may include a local direct wireless communication interface distinct from the wireless network interface. The notification service may be configured to broadcast, via the local direct wireless communication interface, a message indicative of the second state. The system may include a mobile device. The mobile device may be configured to receive and process the broadcast message indicative of the second state, the broadcast message being received directly from the network-enabled wireless unit. The mobile device may be configured to, in response to the processed broadcast message, present an indication of the second state. The mobile device may be configured to, in response to the processed broadcast message, transmit a suppression message to the notification service system, wherein the suppression message instructs the notification service system to suppress notification to the user device. The network-enabled wireless unit may include an environmental sensor that measures an environmental condition and the local status is based on measurements made by the environmental sensor and the environmental condition is an amount of smoke or carbon monoxide. The network-enabled wireless unit may include a power supply, the power supply providing power to components of the network-enabled wireless unit exclusively from one or more batteries. The wireless device may be further configured to determine an amount of time that has elapsed between determining the local status has changed from the first state to the second state and the network connection being established. The wireless device may be further configured to compare the determined amount of time with a stored threshold amount of time. Transmitting the historical status array to the notification service system may be contingent on the determined amount of time not exceeding the stored threshold amount of time.

In some embodiments, a non-transitory processor-readable medium is presented. The medium may include instructions that cause one or more processors to determine a local status has changed from a first state to a second state based on measurements from one or more environmental sensors. The medium may include instructions that cause one or more processors to establish a network connection that permits communication with a notification service system in response to determining the local status has changed, wherein the notification service system maintains a remote status to be synchronized with the local status. The medium may include instructions that cause one or more processors to determine the local status has reverted to the first state following the network connection being established but prior to synchronization with the notification service system. The medium may include instructions that cause one or more processors to transfer, via a wireless network interface, a historical status array to the notification service system in response to determining the local status has reverted to the first state prior to synchronization, wherein the remote status remains unchanged at the notification service system due to the local status having reverted to the first state prior to synchronization. In some embodiments, the medium may include instructions that cause one or more processors to determine an amount of time that has elapsed between determining the local status has changed from the first state to the second state and the network connection being established. The medium may include instructions that cause one or more processors to compare the determined amount of time with a stored threshold amount of time. Transmitting the historical status array to the notification service system may be contingent on the determined amount of time not exceeding the stored threshold amount of time.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3A illustrates an embodiment of a historical status array that can be transmitted in the event of a delayed status update.

FIG. 3B illustrates an embodiment of a remote data array that can be maintained by a notification service system about a wireless sensor unit.

DETAILED DESCRIPTION

Figure 1:
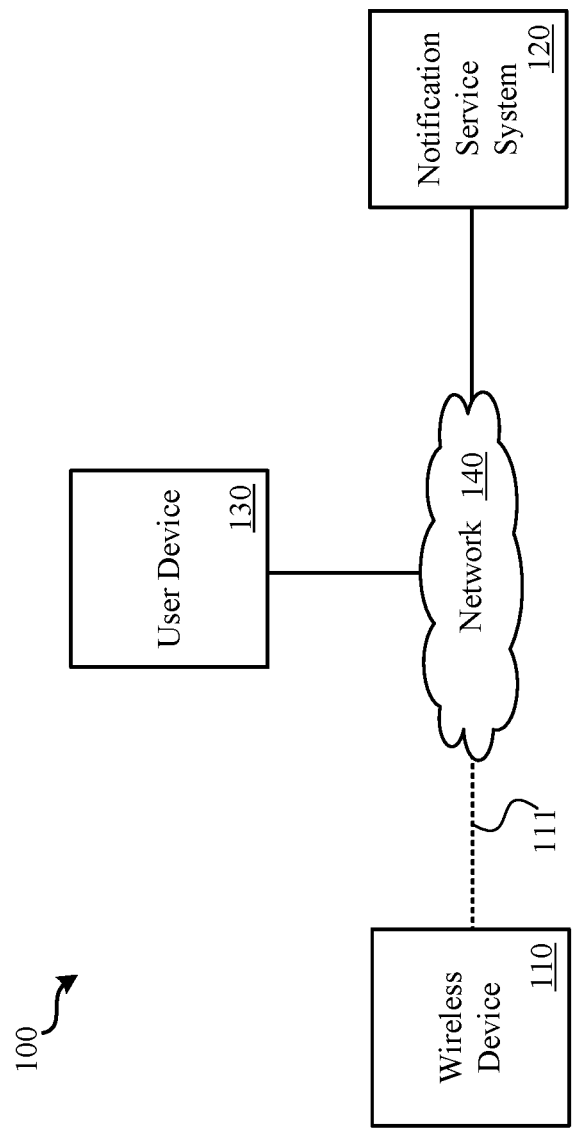
FIG. 1 illustrates a block diagram of a system for handling delayed status updates.

"Smart devices" typically refer to computerized network-enabled devices. Some of such devices can be installed in a home or another type of structure and can include smoke and carbon monoxide (CO) detectors. Smoke and CO detectors can be individual devices or incorporated as part of a single device (collectively referred to as hazard detectors). A smart hazard detector may have the ability to alert a user via a network connection when a hazard, such as smoke or carbon monoxide, is detected in the environment of the hazard detector. For instance, regardless of whether the user is at home or another remote location, a user device possessed by the user that has been associated with the hazard detector may receive a notification that the hazard has been detected.

Ideally, when a hazard is detected by a smart hazard detector, a user device may present a notification in real time (that is, as close to immediately as possible, such as within a few seconds). However, such smart hazard detectors may not be continuously connected with a network that allows for such a notification to be sent immediately. Such hazard detectors may be "low power" devices that rely on one or more batteries for power. For such devices, a continuous connection to a wireless network may drain the batteries at a significant rate, rendering the ability to stay continuously connected with the network impractical. Further, even if the hazard detector is not a low-power device that is only intermittently connected with a wireless network, when a hazard is detected, there is no guarantee that the network itself will be immediately available. For example, the power may be out and/or wireless traffic or interference may prevent immediate connection with the wireless network.

Once a hazard detector successfully establishes a network connection, status information about the hazard detector may be transmitted to a remote server system. This remote server system may then send one or more notifications (e.g., push notifications) to one or more user devices based on the status information (e.g., informing one or more users of a detected hazardous condition). However, a delay between when a smart hazard detector detects the hazardous condition and when the hazard detector is able to communicate with a network may result in a hazard event being "missed." In such a missed situation, by the time that the hazard detector provides status information to the remote server system, the status of the hazard detector has returned to a normal or standby state. In such a missed situation, the remote server may receive current status information indicating that the hazard detector is in a normal or standby state (indicative of no significant amount of hazard being measured in the hazard detector's ambient environment). As an example of such a situation, a person burning toast, resulting in a few wisps of smoke, may briefly trigger the hazard detector to register a hazardous condition and change a state of a status of the hazard detector from standby to smoke detected or some equivalent. By the time the hazard detector connects with the remote server to report the state change, the smoke may have sufficiently dissipated such that the hazard detector returns to a standby state. While the hazard detector may have briefly sounded and/or provided a visual alert, the one or more users associated with a user account of the hazard detector may not receive a notification via their user devices because the status of the hazard detector returned to the standby state prior to the hazard detector updating its status with the remote server system. Such an arrangement can cause a loss of confidence in the hazard detector (and/or a user's home automation system) because the one or more users did not receive an expected notification.

To remedy such an occurrence and possibly help prevent any loss of confidence in the hazard detector (and/or home automation system), the hazard detector and remote server system may be configured to provide notifications indicative of the hazard in certain situations even if the hazardous condition is no longer detected by the hazard detector. Such notifications, which refer to an event that has already concluded, can be understood as "retroactive messages." If, by the time the hazard detector is able to effectively communicate with the remote server system via a network connection, the hazard is no longer detected, a historical status array may be provided to the remote server system instead of or in addition to the detector's current status. This historical status array, which can be in the form of a table, may only be provided to the server system if less than a threshold amount of time has elapsed since the detector has transitioned back to the standby state. The historical status array may be analyzed by the remote server system according to rules that are maintained on the server to determine if a notification should be sent to the one or more user devices and, if so, what the content of the notification should be. If the analysis of the array results in a determination that a notification should be sent, the one or more user devices may receive push notifications that indicate the hazard event indicated to the remote server system in the historical status array.

While the above description is focused on smoke and/or carbon monoxide hazard detectors, it should be understood that the principles detailed throughout this document can be extended to other types of hazard detectors and, more generally, sensor units, such as humidity sensor units, temperature sensor units (e.g., thermostats), ammonia sensor units, alarm systems (e.g., home security systems), water leak sensor units, etc. Further, such use of a historical array for out-of-date state information can have applications in devices other than sensor units that periodically lose connectivity with a remote server system, such as mobile or non-mobile cellular devices, wireless devices, and wireless equipment. Additionally, while the embodiments detailed herein are focused on devices that communicate wirelessly, it should be understood that the principles detailed herein can be applied to wired network arrangements.

FIG. 1 illustrates a block diagram of a system 100 for handling delayed status updates. System 100 may include wireless device 110, notification service system 120, user device 130 (which can also be referred to as a mobile device), and network 140. Wireless device 110 may be a power-limited device: meaning a device at which power consumption is a significant concern. An example of a power-limited device is a battery-powered device. Since it may be undesirable for batteries to be changed frequently, the amount of wireless communication conducted by wireless device 110 may be limited, such as by only having wireless device 110 intermittently connected with network 140.

Various examples of wireless device 110 can include: smoke detectors, carbon monoxide detectors, thermostats, and alarm systems. Such devices may be exclusively battery powered. Alternatively, or additionally, such devices may receive power from a wired power source. For example, a smoke and/or CO detector may use a hard-wired power source that is connected with a structure's power circuit.

Wireless device 110 can represent a device that is only intermittently connected with network 140. This intermittent connection is represented by dotted line 111. Wireless device 110 may only connect with network 140 in certain circumstances, such as based on: 1) a state change of wireless device 110; and 2) a periodic or scheduled check-in with notification service system 120 (e.g., once every hour, two hours, eight hours, day, week, etc.). When wireless device 110 attempts to connect with network 140, the connection may not be immediately available. For instance, depending on the protocol used and the amount of wireless traffic, it could take several seconds or even minutes for wireless device 110 to connect with network 140. Further, network 140 may not be immediately available. The amount of time for wireless device 110 to successfully connect with network 140 may be contingent on whether a portion of network 140 is available. For example, a power outage could affect whether network 140 is available for a connection with wireless device 110.

Network 140 can represent one or more connected networks that allow wireless device 110 and other computerized devices to communicate with each other. Typically, network 140 may include the Internet, and internet service provider's network, and a local wireless network. The wireless network may be restricted to the vicinity of wireless device 110, such as a wireless local area network (WLAN) that operates according to an IEEE 802.11 protocol. Such a WLAN may be hosted by a router located at the structure at which wireless device 110 is located. Other types of wireless communication with network 140 may also be possible, such as via wireless communication according to the IEEE 802.15.4 protocol, Bluetooth®, Wi-Fi Direct® or another wireless communication protocol.

Network 140 is in communication with notification service system 120. Notification service system 120 may be one or more computer systems that may be geographically distributed that provide services, including notification services. Notification service system 120 may intermittently receive data from wireless device 110. Receipt of such data can be dependent on wireless device 110 being able to properly establish a communication connection with notification service system 120 via network 140. Therefore, if one or more components of network 140 are unavailable (e.g., router, cable modem, DSL modem, fiber optic link, Internet Service Provider (ISP) system, etc.) it may not be possible for notification service system 120 to receive status information from wireless device 110. When network 140 is functioning and wireless device 110 is able to communicate with network 140 (and notification service system 120 is able to communicate with network 140), notification service system 120 can receive periodic check-in messages from wireless device 110 and/or notifications of state changes at wireless device 110. Notification service system 120 may analyze state data received from wireless device 110 and determine if a notification should be transmitted. If notification service system 120 determines that a notification should be transmitted based on data received from wireless device 110, notification service system 120 may identify one or more user devices, such as user device 130, associated with wireless device 110. For example, based on an identifier received with data from wireless device 110, notification service system 120 may determine that user device 130 is linked with wireless device 110. A notification indicative of the information received by notification service system 120 may be provided to user device 130. The notification sent by notification service system 120 to user device 130 may be a push notification. Such a push notification may not require information sent by notification service system 120 to user device 130 to be in response to a request originating from the user device.

User device 130 may be any form of computerized device which can communicate with network 140. User device 130 may use a WLAN, LAN, cellular network, and/or the Internet to communicate with notification service system 120. Examples of user device 130 can include: smartphones, cellular phones, tablet computers, laptop and desktop computers, Internet-enabled televisions, and other network-enabled computing devices. User device 130 may receive the push notification and present information indicative of the notification, such as via a pop-up message, a banner message, a message within an application installed on or otherwise accessible through user device 130, and/or text message.

While FIG. 1 illustrates a single wireless device and user device, it should be understood that notification service system 120 may manage notification for a large number of wireless devices, such as tens or hundreds of thousands of wireless devices. For each wireless device which communicates with notification service system 120, notification service system 120 may maintain a status array indicative of one or more states of the corresponding wireless device. For example, in association with an identifier of wireless device 110, the following fields may be stored by notification service system 120: an indication of a first status, an indication of a second status, a history of the first status, and a history of the second status. In this example, while wireless device 110 has two distinct statuses, it should be understood that in other embodiments, wireless device 110 may have a single status or more than two.

When wireless device 110 establishes a network connection with notification service system 120 in response to a state change of a first status at wireless device 110, it may write the state of the first status to the corresponding field maintained by notification service system 120. However, if by the time wireless device 110 has successfully established a communication link with notification service system 120, the first status of wireless device 110 has reverted to a previous state (e.g., a standby state), the status written to notification service system 120 may not change (or, alternatively, wireless device 110 may not perform the write since the value stored by notification service system 120 already reflects the current status). For example, the first status of wireless device 110 may have two (or more) possible values, such as "standby" and "alarm." Notification service system 120 can have one or more fields that store remote indications of these statuses. A transition from standby to alarm at wireless device 110 may trigger wireless device 110 to establish a communication link via network 140 with notification service system 120. By the time that wireless device 110 is able to update the first status at notification service system 120, the first status may have reverted back to standby at wireless device 110. As such, regardless of whether or not wireless device 110 writes the now-active standby status to the associated field of notification service system 120, the remote status value stored by notification service system 120 remains unchanged from its previous value (assuming that the remote status value was set to standby prior to the communication link being established). Since the standby value is unchanged at notification service system 120, notification service system 120 may not be triggered to take any notification action based on the stored remote status value.

Since the first remote status was not changed by wireless device 110, it may provide a historical array indicative of previous states of the first status to notification service system 120. This historical array may include multiple previous states of the first status and associated timestamp indications. Notification service system 120 may then parse or otherwise analyze this array to determine if a notification should be transmitted to user device 130, and, if so, possibly determine the content of the notification.

Figure 2:
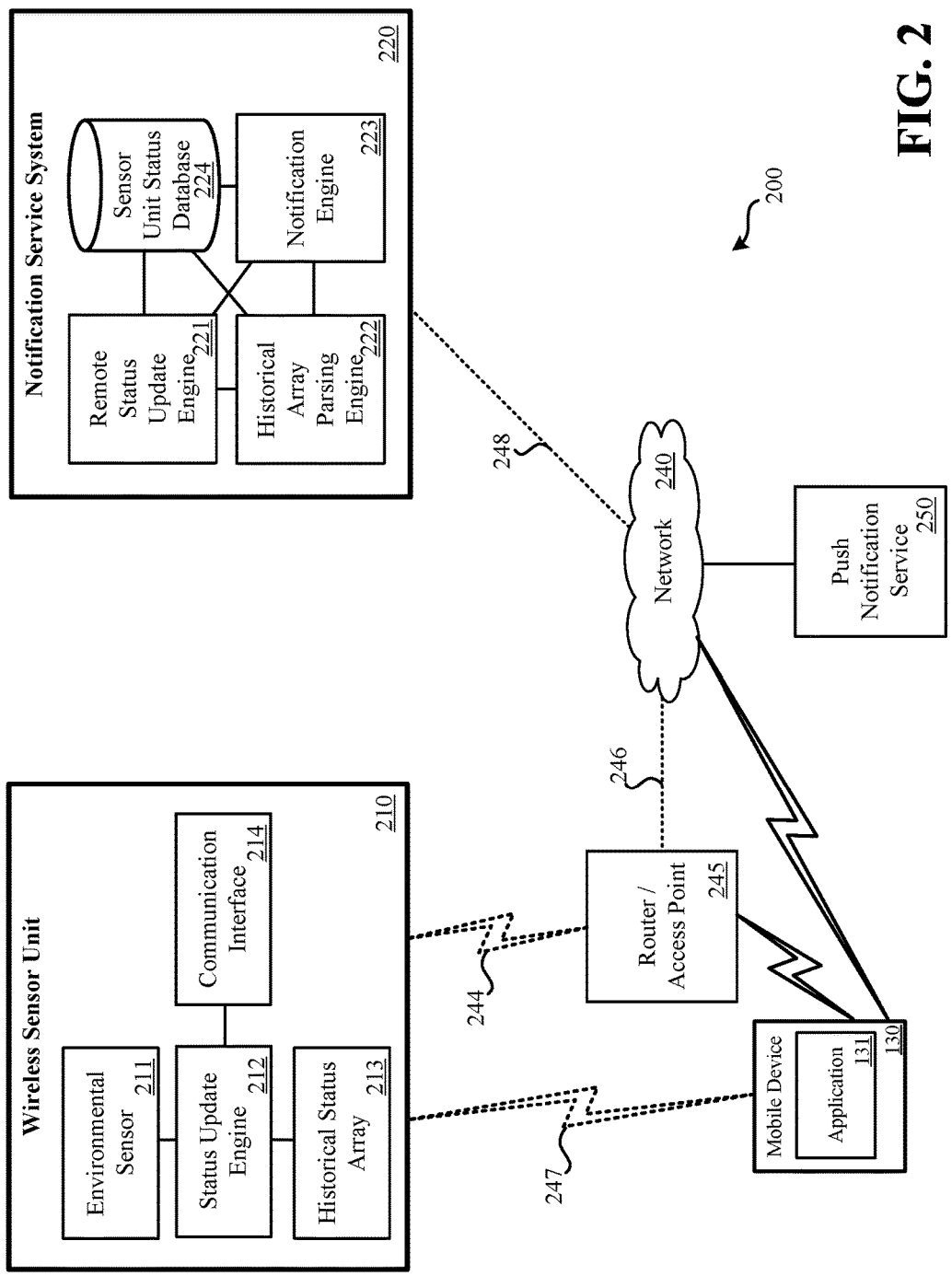
FIG. 2 illustrates a block diagram of an environmental monitoring system for handling delayed status updates.

FIG. 2 illustrates a block diagram of an environmental monitoring system 200 for handling delayed status updates. Environmental monitoring system 200 can represent a more detailed embodiment of system 100 of FIG. 1. System 200 can include: wireless sensor unit 210, notification service system 220, network 240, router/access point (AP) 245, user device 130 and push notification service 250. It should be understood that wireless sensor unit 210 can represent an embodiment of wireless device 110, notification service system 220 can represent notification service system 120, and network 240 can represent an embodiment of network 140.

Wireless sensor unit 210 may be a device that includes one or more on-board sensors, such as environmental sensors, that measures one or more ambient environmental conditions. For example, wireless sensor unit 210 may be a smoke detector and/or CO detector. In other embodiments, wireless sensor unit 210 may be an alarm system or some other type of sensor unit or wireless unit. Wireless sensor unit 210 may include: environmental sensor 211, status update engine 212, historical status array 213, and communication interface 214. Environmental sensor 211 may represent a sensor that outputs measurements of an ambient environmental condition, such as smoke or CO. Such measurements may be quantified and provided to status update engine 212. Status update engine 212 may represent a process that is executed by one or more general- or special-purpose processors or controllers. It should be understood that wireless sensor unit 210 is a computerized device having an embodiment of computer system 1000 integrated on-board as part of the unit.

Status update engine 212 may monitor measurements made by environmental sensor 211 to determine a state to which a status of wireless sensor unit 210 should be set. The status may have two or more possible states. In some embodiments, the status has three or four states. For example, the states may be: "standby," "heads-up," and "alarm." The "standby" state may be indicative of less than a first threshold amount of an environmental condition (e.g., an environmental hazard) being sensed by environmental sensor 211. The "heads-up" state may be indicative of less than a second threshold amount of the environmental condition being sensed by environmental sensor 211, but greater than the first threshold amount. This amount of the environmental condition can be generally understood as significant enough for it to be worthwhile to inform a user of its presence, but not significant enough to sound an alarm. The "alarm" state may be indicative of greater than a second threshold amount of the environmental condition being sensed by environmental sensor 211. This alarm state may cause an auditory and/or visual alarm to be output locally by wireless sensor unit 210. For example, if wireless sensor unit 210 is a combination smoke and CO detector, if a large amount of smoke is detected, the alarm state may be entered by status update engine 212 and a loud alarm may be sounded.

Status update engine 212 may at least: 1) periodically (e.g., once per hour, day, etc.) send a status update to notification service system 220; and 2) send a status update to notification service system 220 when a status change occurs at wireless sensor unit 210. Status update engine 212 may maintain a local status table similar to Table 1 that indicates a smoke status, a CO status, and an indication of whether a synchronization of the status has been performed.

TABLE 1

| | Smoke Status | CO Status | Synchronized |
|---|---|---|---|
| Value | Standby | Alarm | N |

Additionally, status update engine 212 may write an indication of the status change to historical status array 213. Historical status array 213 can represent multiple arrays for each status of the wireless sensor unit or can be a single array for the one or more statuses of wireless sensor unit 210. For example, referring to Table 1, a separate historical status array may be maintained for the smoke status and the CO status. When a status transitions from standby to a state other than standby, the historical status array may be cleared and the new status may be written to historical status array 213.

Mobile device 130 may communicate with notification service system 220 via router/access point 245 and/or directly via network 240 (e.g., via a cellular network). Additionally, in some embodiments, communication between wireless sensor unit 210 and mobile device 130 may be performed directly. Therefore, if communication with router/access point 245, network 240, and/or notification service system 220 is not available, wireless sensor unit 210 may be able to communicate directly with mobile device 130. For example, direct communication 247 may be established using Bluetooth®, Bluetooth Low Energy® (BLE), WiFi Direct®, or some other protocol that allows for local device-to-device communication. Direct communication 247 may be performed by a wireless communication interface distinct from the wireless communication interface used to communicate with router/access point 245. In some embodiments, when a state change occurs to a status at wireless sensor unit 210, in addition to writing the state change to historical status array 213 and attempting to communicate with notification service system 220, wireless sensor unit 210 may broadcast, such as via Bluetooth, an indication of the state change. If within communication range of wireless sensor unit 210, mobile device 130 may receive the broadcast. In some embodiments, mobile device 130 may only process the broadcast if an application 131 associated with wireless sensor unit 210, is being executed. For example, if a user has application 131 active on mobile device 130 and wireless sensor unit 210 is within communication range for direct communication 247 and wireless sensor unit 210 changes state, an indication of the state change may be presented to the user of mobile device 130 based on the received broadcast, such as "Smoke levels are rising in the Office."

Since the direct communication may be sent as a broadcast, wireless sensor unit 210 may be unware whether or not a notification has been presented to a user via mobile device 130. Thus, to prevent a future notification from being sent to the mobile device based on the notification service system 220 parsing the historical array, mobile device 130 may transmit a message to notification service system 220 to suppress notifications for a period of time. For example, in response to presenting a notification in response to receiving a broadcast from wireless sensor unit 210, application 131 may cause mobile device 130 to send a message to notification service system 220 that suppresses notification from being sent to mobile device 130 (and possibly other mobile devices). This may involve a flag or field associated with wireless sensor unit 210 being set within sensor unit status database 224. This flag or field may be cleared by notification service system 220 after a defined period of time (e.g., five minutes) and/or may be cleared based on a subsequent message transmitted from mobile device 130. In order for notification engine 223 to transmit a notification to mobile device 130 and/or for historical array parsing engine 222 to parse a received historical status array 213, it may be required that the field or field associated with a direct notification stored by sensor unit status database 224 indicate that a notification as a result of direct communication has not been output by mobile device 130.

FIG. 3A illustrates a sample historical status array 300A that can be stored as historical status array 213 and which may be transmitted in the event of a delayed status update. For example, historical status array 300A may be for a smoke or CO status of wireless sensor unit 210. Historical status array 300A may be stored in the form of a table and may include historical state values for a particular status (which can be represented by a numeric value indicative of the state), an indication of whether the state has already been synchronized with notification service system 220, and a timestamp, which can be stored in the form of UTC (Coordinated Universal Time) seconds. Historical status array 300A may have a maximum number of stored historical entries, such as two, three, four, five, or some greater number. In some embodiments, the previous four entries are stored. In such embodiments, if more than four entries are written to historical status array 300A prior to historical status array 300A being cleared, the oldest entry may be dropped. As such, historical status array 300A may maintain the most recent four entries. Historical status array 300A is illustrated as having a state for a single status (such as smoke status or CO status). It should be understood that separate historical status arrays may be maintained for smoke, CO, and/or any other environmental condition that is monitored by wireless sensor unit 210, or a single historical status array 300A can be maintained that has fields for multiple statuses (or states of the multiple statuses can be combined into a single field).

FIG. 3B illustrates an embodiment of a remote data array 300B that can be maintained by a notification service system about a wireless sensor unit or other form of wireless unit. Remote data array 300B, which can be in the form of a table, can maintain information about many wireless sensor units, such as including wireless sensor unit 210. Remote data array 300B can include: a unique identifier of a wireless sensor unit field (which can be used as the database key), a state field, a synchronized field, a timestamp field, a CO status history, and a smoke status history. When the wireless sensor unit transmits data to the notification service system, the data transmitted may be used to update the fields associated with the identifier of the wireless sensor unit. The state field may be a field that is indicative of one or more states, such as states related to CO and smoke. (In other embodiments, separate fields may be stored by the notification service system that indicate different statuses, such as a smoke state and a CO state.) This state field can be understood as a remote state field, as it ideally represents the current state(s) of one or more statuses of the wireless sensor unit, but this is not always possible to the latency of the wireless sensor unit establishing a communication link with the notification service system. The timestamp field may indicate a (UTC) time when the last time the status field was updated. CO status history and smoke status history fields may store arrays of data. When a historical status array, such as 300A, is to be used in sending a notification to the user, the historical status array may be uploaded or otherwise transmitted to the corresponding data array field depending on the type of environmental condition. That is, a CO historical status array would be uploaded to the CO status history array; and a smoke historical status array would be uploaded to the smoke status history array. A write to either of these arrays stored by the notification service system can trigger parsing of the arrays by a process of the notification service system to determine if a notification should be sent.

In response to a status as presented in table 1 being changed by status update engine 212 based on measurements from environmental sensor 211, communication interface 214 may be activated to establish a communication path with notification service system 220. In some embodiments, communication interface 214 communicates via a wireless communication protocol with router/access point 245. Wireless link 244 may be established by communication interface 214 to communicate with router/access point 245. Further, based on the status changing, it may be necessary for status update engine 212 to wake wireless sensor unit 210 from a sleep state. Such a wake sequence may take a significant amount of time, such as greater than 15 seconds (e.g., 17.5 seconds). Further, to establish a link with router/access point 245, it may take a substantial amount of time, such as up to a minute, or in some cases, greater than a minute.

For wireless sensor unit 210 to successfully communicate with notification service system 220, it may also be necessary for router/access point 245 to have an active connection with network 240. Router/access point 245 may include a router, modem, and/or other equipment that allows wireless sensor unit 210 to communicate with network 240. Router/access point 245 may use communication link 246 to communicate with an ISP through which wireless sensor unit 210 can communicate with computer systems in communication with the Internet. The ability of wireless sensor unit 210 to communicate with notification service system 220 may be contingent on communication link 246 being available. As such, if communication link 246 is temporarily not available, the amount of time for wireless sensor unit 210 to provide status update information to notification service system 220 may be increased. This is additionally true for the communication link 248 between network 240 and notification service system 220.

Notification service system 220 may include: remote status update engine 221, historical array parsing engine 222, notification engine 223, and sensor unit status database 224. It should be understood that notification service system 220 is a computerized device, such as one or more computer servers, that can include an embodiment of computer system 1000 of FIG. 10. Notification service system 220 may store an array of data for each wireless sensor unit, including wireless sensor unit 210, which is registered with notification service system 220 in sensor unit status database 224. When remote status update engine 221 determines that a state for one or more statuses of a wireless sensor unit 210 has been changed, in response, a notification may be sent by notification engine 223 to a user device associated with the wireless device. However, if the state of a status is not changed by a wireless sensor unit in the wireless sensor unit's associated data array, notification engine 223 may not be triggered by remote status update engine 221 to send a notification to an associated user device.

Status update engine 212 may first attempt to provide current status information of wireless sensor unit 210 to remote status update engine 221. If, by the time a communication link is established between communication interface 214 and notification service system 220, the current one or more statuses of wireless sensor unit 210 have reverted to standby states and/or the reversion of the status at wireless sensor unit 210 has caused the status information that was to be provided to match status information already stored by remote status update engine 221 for wireless sensor unit 210, status update engine 212 may, additionally or alternatively, provide historical status information to notification service system 220 from historical status array 213.

If, by the time communication interface 214 has established a communication link with notification service system 220, the one or more statuses of wireless sensor unit 210 have reverted to a standby state, status update engine 212 may evaluate whether it is appropriate to send data from stored historical status array 213. Status update engine 212 may evaluate if less than a predefined, stored amount of time has elapsed between when the state of the wireless sensor unit reverted to standby and when the communication link was successfully established with notification service system 220. In some embodiments, the predefined amount of time is five minutes; however, it may be greater or smaller in other embodiments, such as 1, 2, 3, 4, 10, 15, or 60 minutes. If the predefined time period has not been exceeded, historical status array 213 may be sent to notification service system 220 for storage in association with the data stored by sensor unit status database 224 associated with wireless sensor unit 210 (such as in FIG. 3B). In some embodiments, a flag may be toggled or set in the remote data array stored by sensor unit status database 224 that indicates that historical status array 213 has been provided to and stored by sensor unit status database 224. In other embodiments, based on a write of a historical status array to notification service system 220 being performed, historical array parsing engine 222 may be triggered to analyze the newly uploaded historical status array.

Historical array parsing engine 222 may analyze the received historical status array now stored by sensor unit status database 224 to determine if: 1) a push notification should be sent to an associated user device by notification engine 223; and 2) what message the notification should include. Historical array parsing engine 222 may use various locally-stored rules to determine if a notification is appropriate to send based on parsing of the received historical status array. For example, historical array parsing engine 222 may assess whether: 1) the most recent state for a status in the historical status array is standby; and 2) the previous states of the status in the historical status array have not been synchronized (as indicated in the synchronized field of historical status array 300A). These two conditions can be indicative of a "completely missed" event (such as smoke or CO being detected and then dissipating) for which no notification has yet been sent to a user device.

Figure 9:
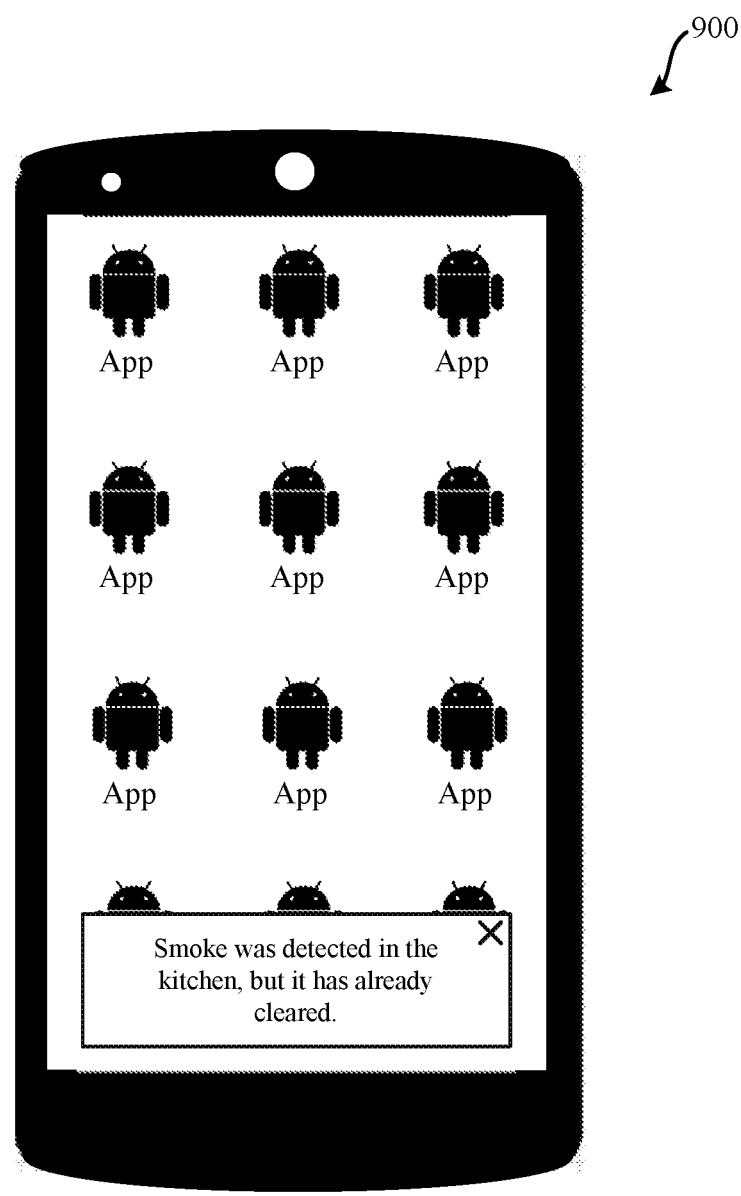
FIG. 9 illustrates an embodiment of a push notification which can be received in response to a retroactive messaging event.

If historical array parsing engine 222 determines that a notification should be sent to the associated device, notification engine 223 may determine an appropriate user device to which the message should be sent by accessing sensor unit status database 224 (or some other database) which stores information that links wireless sensor units with user contact data (e.g., email addresses, application instances, phone numbers, etc.). Notification engine 223 may send a notification based on the analysis performed by historical array parsing engine 222. Notification engine 223 may assign an appropriate message from a database or table of messages that are correlated to various outcomes of analysis performed by historical array parsing engine 222. For example, such responses can be understood as retroactive that include messages indicative of a past condition that is no longer present: "The smoke has cleared."; "There was smoke, but now it has cleared."; "Smoke was briefly detected in your home. It cleared quickly."; "Carbon monoxide has cleared."; "There was carbon monoxide, but now it has cleared."; and "Carbon Monoxide was briefly detected in your home. It cleared quickly." represent a handful of examples. The content of the message sent would, of course, vary based on the type of environmental condition sensed. As an example of how such a notification may be presented to an end user, FIG. 9 illustrates an embodiment of a push notification 900 being presented on a user device. Such a notification can be understood as a retroactive message since the condition the user is being notified of has already concluded.

Depending on the type of user device, push notification may be controlled by a particular entity. Push notification service 250 may handle all push notifications being sent to a particular brand of device or device operating a particular operating system (e.g., Android®, iOS®). As such, notification engine 223 may transmit the desired push notification to push notification service 250 along with an identifier of the user device, such as user device 130, to which the notification is to be pushed. Push notification service 250 may be operated by a third-party operator. Push notification service 250 may then cause the notification to be sent to the associated user device. In other embodiments, notification engine 223 may be able to push notifications directly to user devices without a separate or third party push notification service being used.

Figure 4:
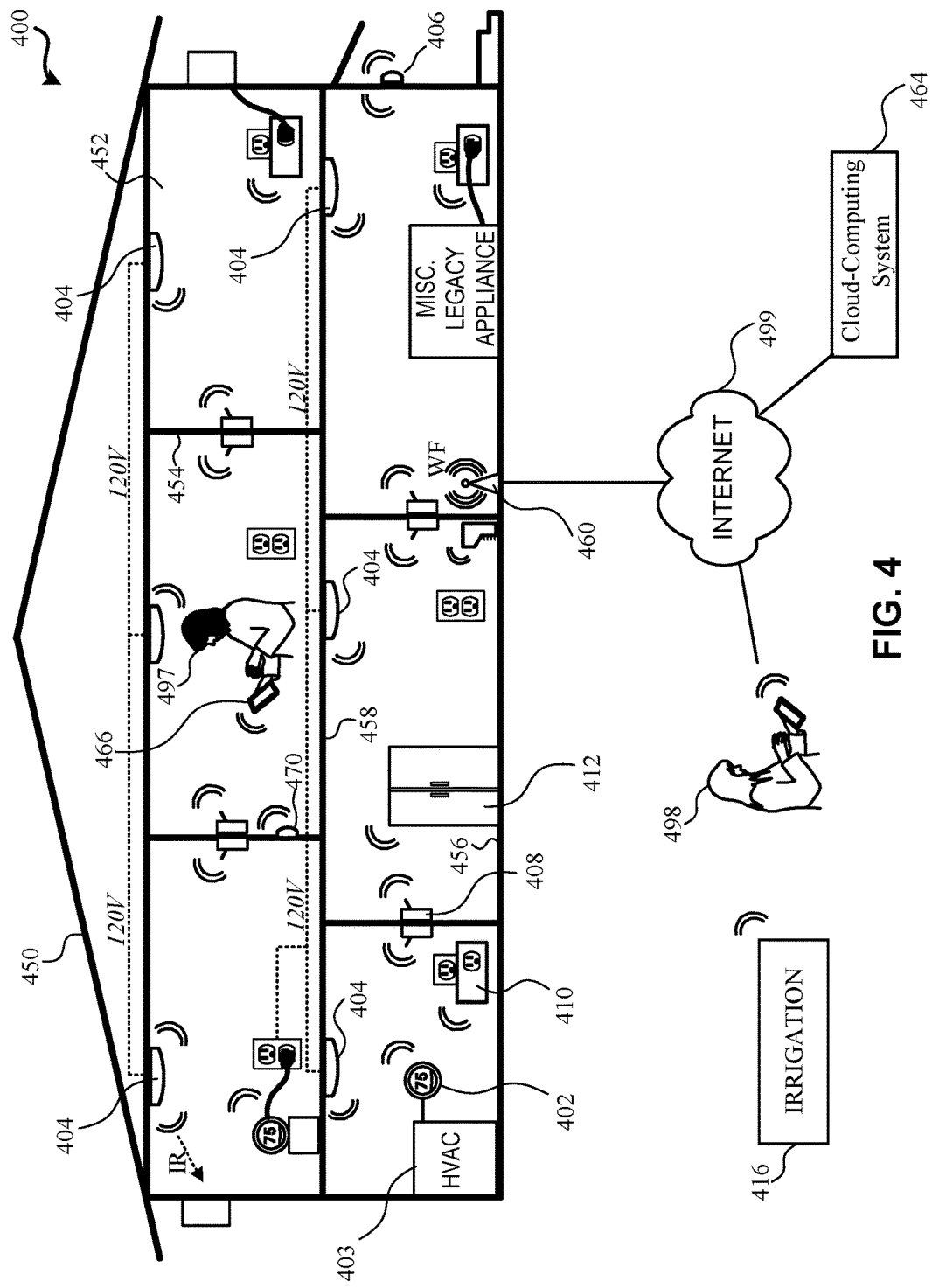
FIG. 4 illustrates an embodiment of a complex in-home wireless environment in which wireless devices can be configured for handling delayed status updates.

Wireless sensor units, as detailed in relation to FIG. 2, can operate in complicated wireless environments, such as in homes or other forms of structures, that have multiple smart devices. FIG. 4 illustrates an example of a smart-home environment 400 within which one or more of the devices, methods, systems, services, and/or computer program products described further herein can be applicable. The depicted smart-home environment 400 can include a structure 450, which can include, e.g., a house, office building, garage, or mobile home. It will be appreciated that devices can also be integrated into a smart-home environment 400 that does not include an entire structure 450, such as an apartment, condominium, or office space. Further, the smart home environment can control and/or be coupled to devices outside of the actual structure 450. Indeed, several devices in the smart home environment need not physically be within the structure 450 at all. For example, irrigation monitor 416 can be located outside of the structure 450.

The depicted structure 450 includes a plurality of rooms 452, separated at least partly from each other via walls 454. The walls 454 can include interior walls or exterior walls. Each room can further include a floor 456 and a ceiling 458. Devices can be mounted on, integrated with and/or supported by a wall 454, floor 456 or ceiling 458.

In some embodiments, the smart-home environment 400 of FIG. 4 includes a plurality of devices, including intelligent, multi-sensing, network-connected devices, that can integrate seamlessly with each other and/or with a central server or a cloud-computing system to provide any of a variety of useful smart-home objectives. The smart-home environment 400 may include one or more intelligent, multi-sensing, network-connected thermostats 402 (hereinafter referred to as smart thermostats 402, which can function as wireless sensor unit 210), one or more intelligent, network-connected, hazard detectors 404, which can also function as wireless sensor unit 210, and one or more intelligent, multi-sensing, network-connected entryway interface devices 406 (hereinafter referred to as "smart doorbells 406"), which can function as wireless sensor unit 210 (e.g., to detect the presence of a person and/or a doorbell press). According to embodiments, the smart thermostat 402 detects ambient climate characteristics (e.g., temperature and/or humidity) and controls a HVAC system 403, accordingly. The hazard detector 404 may detect the presence of a hazardous substance or a substance indicative of a hazardous substance (e.g., smoke, fire, or carbon monoxide). Entryway interface device 406 may detect a person's approach to, or departure from, a location (e.g., an outer door), control doorbell functionality, announce a person's approach or departure via audio or visual means, or control settings on a security system (e.g., to activate or deactivate the security system when occupants go and come).

In some embodiments, the smart-home environment 400 of FIG. 4 further includes one or more intelligent, multi-sensing, network-connected wall switches 408 (hereinafter referred to as "smart wall switches 408"), along with one or more intelligent, multi-sensing, network-connected wall plug interfaces 410 (hereinafter referred to as "smart wall plugs 410"). The smart wall switches 408 may detect ambient lighting conditions, detect room-occupancy states, and control a power and/or dim state of one or more lights. In some instances, smart wall switches 408 may also control a power state or speed of a fan, such as a ceiling fan. The smart wall plugs 410 may detect occupancy of a room or enclosure and control the supply of power to one or more wall plugs (e.g., such that power is not supplied to the plug if nobody is at home). Again, such devices may be used as wireless sensor unit 210.

Still further, in some embodiments, the smart-home environment 400 of FIG. 4 includes a plurality of intelligent, multi-sensing, network-connected appliances 412 (hereinafter referred to as "smart appliances 412"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. Such devices may be used as wireless device 110 or wireless sensor unit 210, which may report status information other than environmental conditions, such as device statuses.

According to embodiments, the smart thermostats 402, the hazard detectors 404, the entryway interface devices 406, the smart wall switches 408, the smart wall plugs 410, and other devices of the smart-home environment 400 are modular and can be incorporated into older and new houses. For example, the devices are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

The smart-home environment 400 may also include communication with devices outside of the physical home, but within a proximate geographical range of the home. For example, the smart-home environment 400 may include an irrigation monitor 416 that communicates information regarding irrigation systems within the smart-home environment 400 and/or receives control information for controlling such irrigation systems. Again, such a component may function as wireless sensor unit 210 of FIG. 2.

By virtue of network connectivity, one or more of the smart-home devices of FIG. 4 can further allow a user (such as users 497 and 498) to interact with the device even if the users are not proximate to the device and receive notification messages as detailed in relation to FIG. 2. For example, a user can communicate with a device using a computer (e.g., a desktop computer, laptop computer, or tablet) or other portable electronic device (e.g., a smartphone) 466. A webpage or app can be configured to receive communications from the user and control the device based on the communications and/or to present information about the device's operation to the user. For example, the user can view a current setpoint temperature for a device and adjust it, using a computer. The user can be in the structure during this remote communication (such as user 497) or outside the structure (such as user 498).

As discussed, users can control and interact with the smart thermostat, hazard detectors 404, and other smart devices in the smart-home environment 400 using a network-connected computer or portable electronic device 466. In some examples, some or all of the occupants (e.g., individuals who live in the home) can register their device 466 with the smart-home environment 400. Such registration can be made at cloud-computing system 464, which can include notification service system 220 of FIG. 2, to authenticate the occupant and/or the device as being associated with the home and to give permission to the occupant to use the device to control the smart devices in the home. An occupant can use his registered device 466 to remotely control the smart devices of the home, such as when the occupant is at work or on vacation and receive notifications (e.g., push notifications). The occupant may also use his registered device to control the smart devices when the occupant is actually located inside the home, such as when the occupant is sitting on a couch inside the home. It should be appreciated that, instead of, or in addition to, registering devices 466, the smart-home environment 400 makes inferences about which individuals live in the home and are therefore occupants and which devices 466 are associated with those individuals. As such, the smart-home environment "learns" who is an occupant and permits the devices 466 associated with those individuals to control the smart devices of the home.

According to embodiments, all or some of the smart devices can serve as wireless or wired repeaters. For example, a first one of the smart devices can communicate with a second one of the smart devices via a wireless router 460. The smart devices can further communicate with each other via a connection to a network, such as the Internet 499. Through the Internet 499, the smart devices can communicate with a cloud-computing system 464, which can include one or more centralized or distributed server systems.

According to embodiments, the smart devices combine to create a mesh network of spokesman and low-power nodes in the smart-home environment 400, where some of the smart devices are "spokesman" nodes and others are "low-powered" nodes. The establishment of such mesh networks may increase an amount of time which takes a unit, such as wireless sensor unit 210 of FIG. 2, to be able to communicate with notification service system 220, due to the extra devices involved. Some of the smart devices in the smart-home environment 400 are battery powered, while others have a regular and reliable power source, such as by connecting to wiring (e.g., to 110 V line voltage wires) behind the walls 454 of the smart-home environment. Devices that are battery powered are referred to as "low-power" nodes. These nodes tend to be smaller than spokesman nodes and can only communicate using wireless protocols that require very little power, such as Zigbee, 6LoWPAN, etc.

An example of a low-power node is a smart nightlight 470. In addition to housing a light source, the smart nightlight 470 houses an occupancy sensor, such as an ultrasonic or passive IR sensor, and an ambient light sensor, such as a photodiode, photo resistor, phototransistor, or a single-pixel sensor that measures light in the room. Smart nightlight 470 can function as wireless sensor unit 210. In some embodiments, the smart nightlight 470 is configured to activate the light source when its ambient light sensor detects that the room is dark and when its occupancy sensor detects that someone is in the room. In other embodiments, the smart nightlight 470 is simply configured to activate the light source when its ambient light sensor detects that the room is dark. Further, according to embodiments, the smart nightlight 470 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 400 as well as over the Internet 499 to cloud-computing system 464.

Other examples of low-powered nodes include battery-operated versions of the hazard detectors 404. These hazard detectors 404 are often located in an area without access to constant and reliable (e.g., structural) power and, as discussed in detail below, may include any number and type of sensors, such as smoke/fire/heat sensors, carbon monoxide/dioxide sensors, occupancy/motion sensors, ambient light sensors, flame detectors, air quality sensors (e.g., for VOCs, particulate matter (e.g., PM 2.5), allergens, and other unhealthy contaminants such as NOx), temperature sensors, humidity sensors, and the like. Furthermore, hazard detectors 404 can send messages that correspond to each of the respective sensors to the other devices and cloud-computing system 464, such as by using the mesh network as described above.

Figure 5:
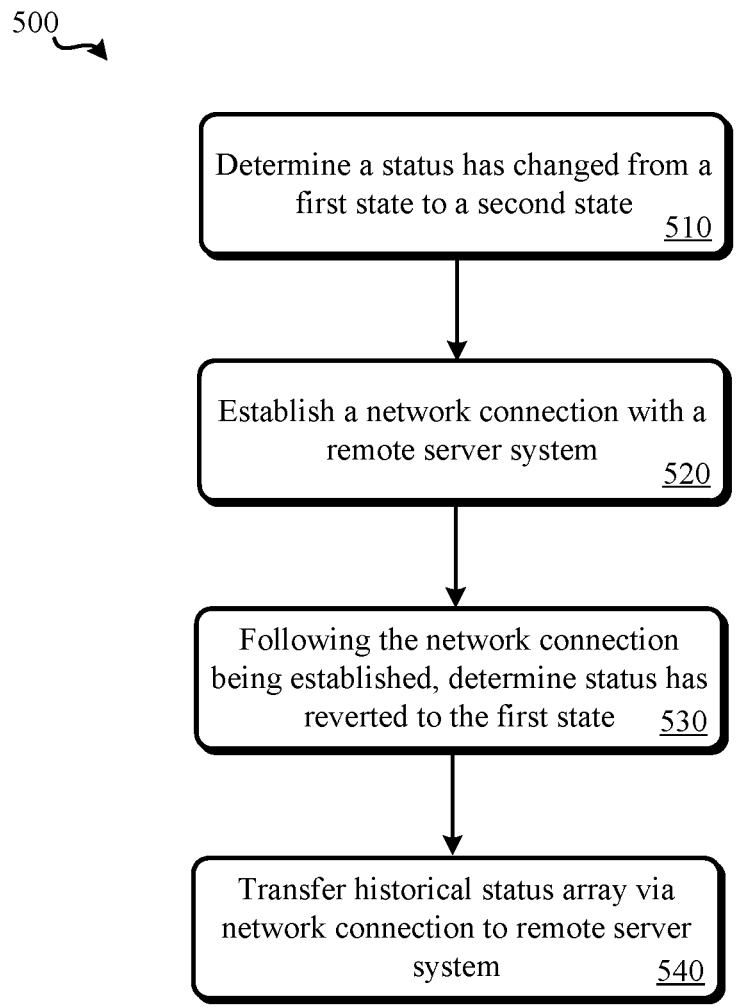
FIG. 5 illustrates an embodiment of a method for handling a delayed status update.

Various methods may be performed using the systems and environments detailed in relation to FIGS. 1, 2, and 4. FIG. 5 illustrates an embodiment of a method 500 for handling a delayed status update. Each step of method 500 may be performed by an embodiment of a wireless device (e.g., wireless device 110 of FIG. 1 or wireless sensor unit 210 of FIG. 2). At block 510, the wireless device may determine that a status has changed from the first state to a second state. This state change from the first state to the second state may be triggered based on one or more measurements that are taken by one or more sensors that are part of the wireless device. In some embodiments, the status is changed based on smoke, carbon monoxide, and/or occupancy measurements. Alternatively, in some embodiments, the status may change from the first state to the second state based on a condition occurring other than one or more measurements being performed using a sensor.

At block 520, in response to determining the status has changed from the first state to the second state at block 510, a network connection may be established with a remote server system. Referring to FIG. 1, the network connection may be established by wireless device 110 through network 140 with notification service system 120. Referring to FIG. 2, wireless sensor unit 210 may establish a communication link with notification service system 220 through router/access point 245 and network 240. Establishment of block 520 of the network connection may take a substantial amount of time. For example, it may take tens of seconds for the wireless device or wireless sensor unit itself to wake up from a low-power mode. Once awake, the wireless device or wireless sensor unit may take a significant amount of time to connect with a local wireless network, such as router/access point 245. For example, it may be possible that up to a minute or longer may elapse for wireless sensor unit 210 to successfully establish a wireless communication link with router/access point 245. Additional time may be required still for a successful communication link to be established between wireless sensor unit 210 and a cloud-based computing system, such as notification service system 220, that is accessible via the Internet.

At block 530, in response to the network connection having been successfully established and the wireless device or wireless sensor unit being able to successfully communicate with the remote notification service system, the wireless device may determine if the status has reverted to the first state. That is, since a significant amount of time may have elapsed since block 510 was performed, it may be possible that the second state has already reverted to the first state. This first state may be a "standby" state. This standby state may be indicative of normal operating conditions and may not be informative, in and of itself, for an indication of such to be provided to a user. For example, the standby state may indicate that smoke and/or carbon monoxide is not being detected by the wireless device. Alternatively, rather than reverting to the first state, at block 540 the wireless device may determine that it has changed to a third state.

While block 530 may be contingent on the network connection being established in some embodiments, in other embodiments the determination of block 530 may be performed following some other criteria. As an example of such a criteria, a fixed, predefined period of time may elapse as block 520 before block 530 is performed. As another example, user input or data from a computerized device may be required to be received at block 520 prior to block 530 being performed. As another example, a power source may be required to charge or an alarm sound at block 520 prior to block 530 being performed. Other criteria are also possible.

At block 540, in response to determining that the status has reverted to the first state (or changed to a third state) at block 530 prior to the second state having been synchronized with the remote server system, a historical status array, such as the historical status array detailed in relation to FIG. 3, may be transferred to the remote server system via the network connection. Accordingly, at block 540, since the current state of the wireless device has returned to standby and may match a stored remote status maintained by the remote server system, the historical status array is transmitted to the remote server system. Such a historical status array may only be transmitted in response to the state of the status having reverted to the first state.

Figure 6:
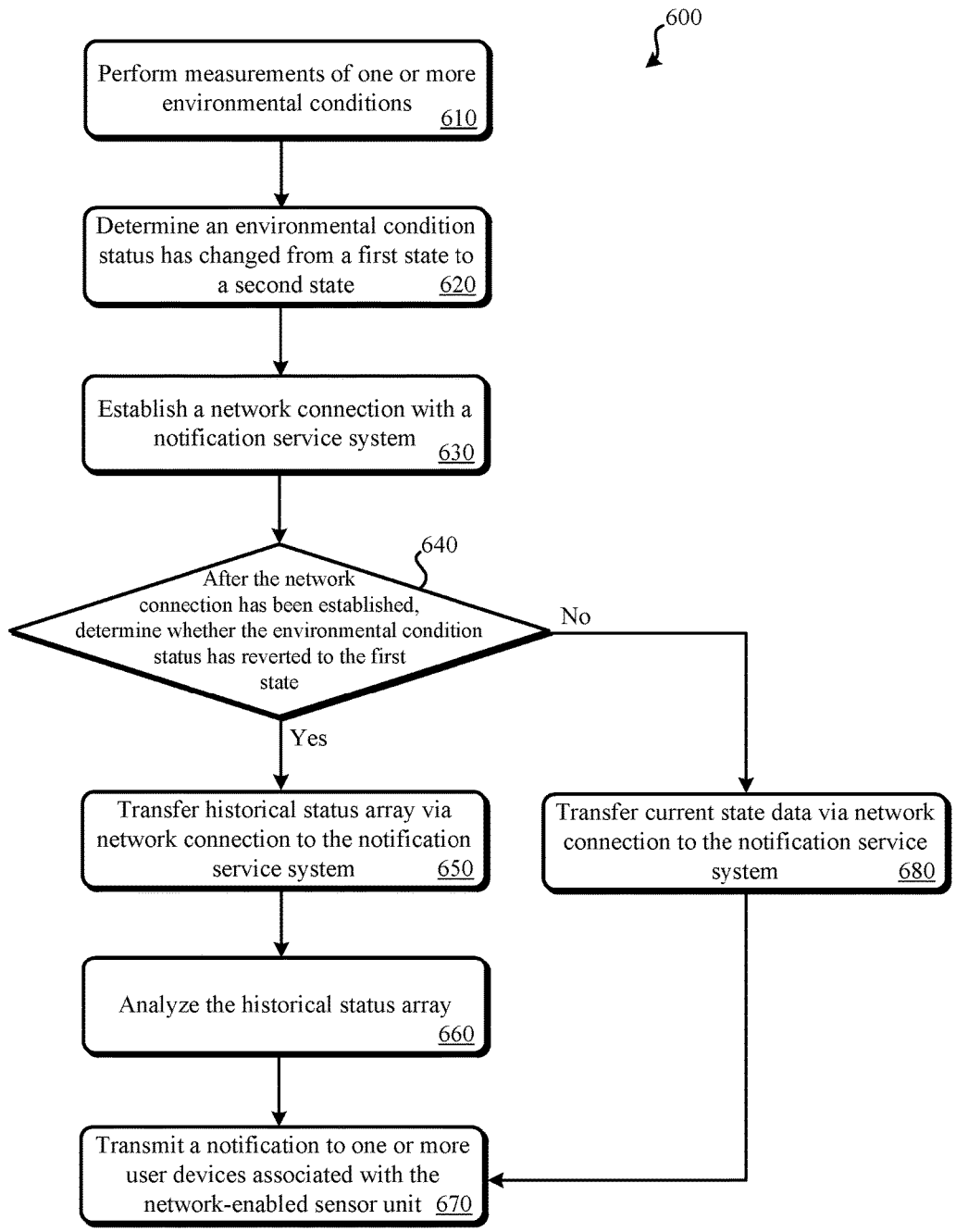
FIG. 6 illustrates another embodiment of a method for handling a delayed status update.

FIG. 6 illustrates an embodiment of a method 600 for handling a delayed status update. Blocks of method 600 may be performed by an embodiment of wireless device (e.g., wireless device 110 of FIG. 1 or wireless sensor unit 210 of FIG. 2) or notification service system (e.g., notification service system 120 and 220 of FIGS. 1 and 2, respectively). Method 600 can represent a more detailed embodiment of method 500 of FIG. 5. At block 610, measurements of one or more environmental conditions may be performed using one or more environmental sensors of the wireless device or wireless sensor unit. In some embodiments, the environmental conditions measured include smoke and CO.

At block 620, the wireless device may determine that a status has changed from a first state (e.g., a standby state) to a second state (e.g., heads-up, warning, or alarm). This state change from the first state to the second state may be triggered based on one or more measurements that are taken by one or more sensors that are part of the wireless device exceeding a defined threshold and, possibly, exceeding the threshold for at least a period of time. In some embodiments, the status is changed based on smoke, carbon monoxide, and/or occupancy measurements. Alternatively, in some embodiments, the status may change from the first state to the second state based on a condition occurring other than one or more measurements being performed using a sensor.

At block 630, in response to determining the status has changed from the first state to the second state at block 620, a network connection may be established with the notification service system. Referring to FIG. 2, wireless sensor unit 210 may establish a communication link with notification service system 220 through router/access point 245 and network 240 (which includes, at least, the Internet). Establishment at block 630 of the network connection may take a substantial amount of time as detailed in relation to block 520.

At block 640, after the network connection has been established with the notification service system at block 630, the wireless sensor unit may determine whether the environmental condition status determined to have changed has reverted to the first state. As such, the determination made at block 640 is indicative of the environmental condition status having reverted to the first state prior to the wireless device being able to update a remote status stored by the notification service system. Between block 620 and block 640, zero or more than one state change may have occurred. Common state change sequences can include: standby to heads-up (or warning) and back to standby; standby to heads-up; standby to alarm; and stand-by to heads-up to alarm and back to standby. It should be understood that the names of such states may vary by embodiment and that "stand-by," "heads-up," and "alarm" are merely examples. Alternatively, rather than determining that the environmental condition status has reverted to the first state, at block 640 the wireless sensor unit may determine that the environmental condition status has changed to a third status. As detailed in relation to block 530, it may also be possible for performance of block 640 to be dependent on other criteria occuring.

If, at block 640, it is determined that the environmental condition status has reverted to the first state of standby (or, possibly, changed to a third state), method 600 may proceed to block 650. At block 650, in response to determining that the status has reverted to the first status at block 640 (or, possibly, changed to a third state) prior to the second state having been synchronized with the remote server system, a historical status array, such as the historical status array detailed in relation to FIG. 3A, may be transferred to the notification service system via the network connection.

At block 660, the historical status array may be analyzed by the notification service system. The notification service system may be triggered to analyze the historical status array based on: the historical status array having been written to the notification service system or a flag or toggle bit having been set by the wireless sensor unit at the notification service system to inform the notification service system that the historical status array has been uploaded and is up-to-date. That is, the notification service system may store a historical status array for each wireless device for which it provides notifications, and may require that an indication be provided when such an associated historical status array should be parsed or otherwise analyzed. The analysis at block 660 may determine: whether the most recent status set at the wireless sensor unit, based on a timestamp, is a standby state, and if one or more previous states are listed in the array that have not previously been synchronized with the notification service system.

As illustrated in FIG. 6, the historical status array is not transferred to the notification service system unless the environmental condition status has reverted to the first state or, possibly, transitioned to some other third state. In some embodiments, the historical status array may be transmitted to the notification service system regardless of whether the status has reverted or changed. Rather, based on the notification service system's analysis of the historical array at block 660, a determination may be made by the historical status array that a retroactive notification is or is not necessary based on the content of the historical status array. For example, a rule may be enforced by the notification service system that if a notification is to be sent that indicates a the status being set to a third state, a retroactive notification about an earlier reversion to the first state is not necessary.

At block 670, a notification may be transmitted to one or more user devices associated with the wireless sensor unit. The notification that is transmitted may be based on the analysis of the historical status array performed at block 660. The notification may also be indicative of the type of environmental condition that triggered the notification, such as smoke or CO. The user devices to which the notification is transmitted may be based upon a database entry that indicates user devices associated with the wireless sensor device from which the historical status array was received.

If, at block 680, it is determined that the environmental condition status has not reverted to the first state of standby, method 600 may proceed to block 680. At block 680, state data indicative of the current status of the wireless sensor unit may be transferred via the network connection to the notification service system. Block 680 may explicitly exclude transmission of the historical status array from being transmitted to the notification service system. That is, if the "no" path is followed from block 640, the historical status array may not be transmitted from the wireless sensor device to the notification service system.

Figure 7A:
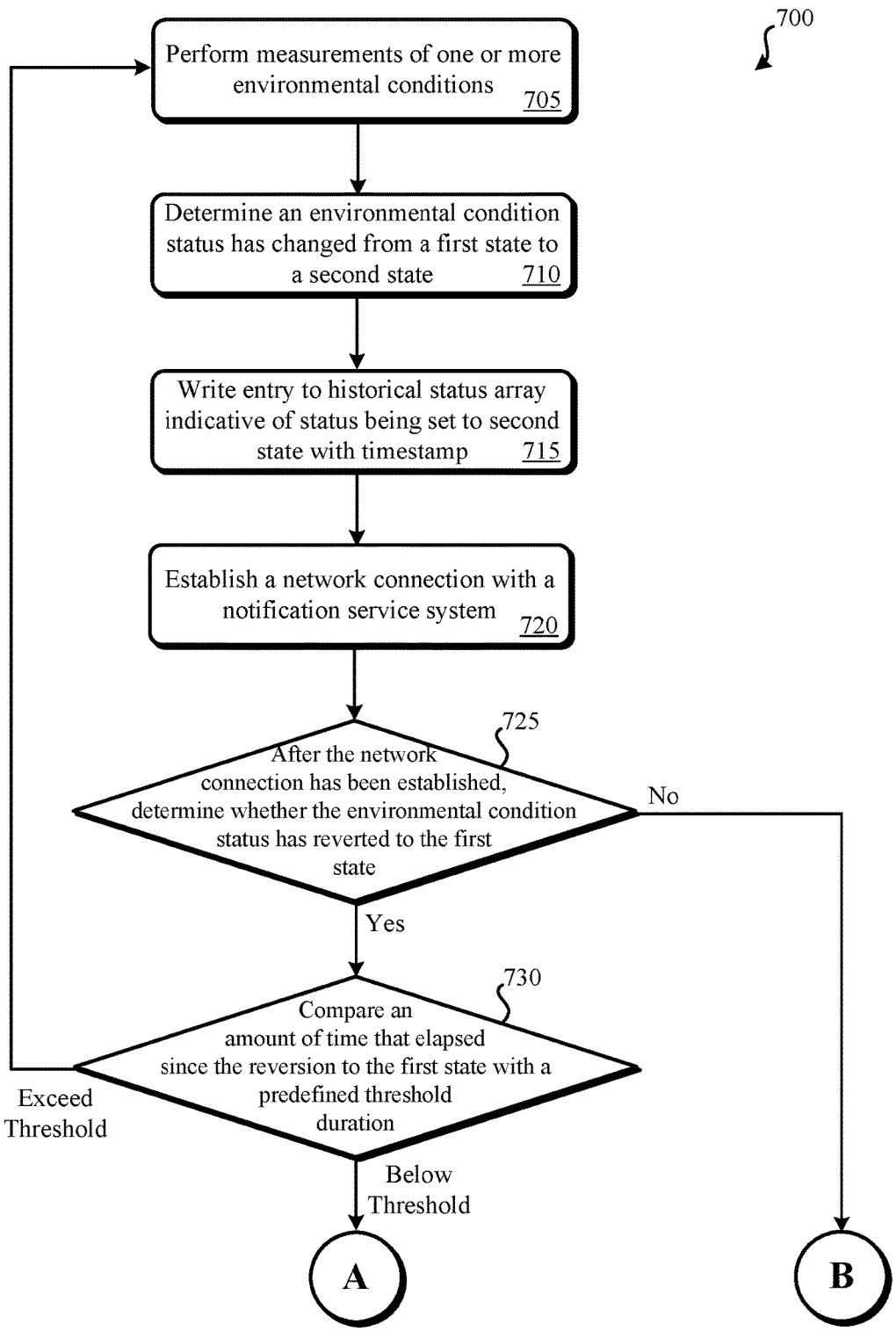
FIGS. 7A and 7B illustrates another embodiment of a method for handling a delayed status update.
Figure 7B:
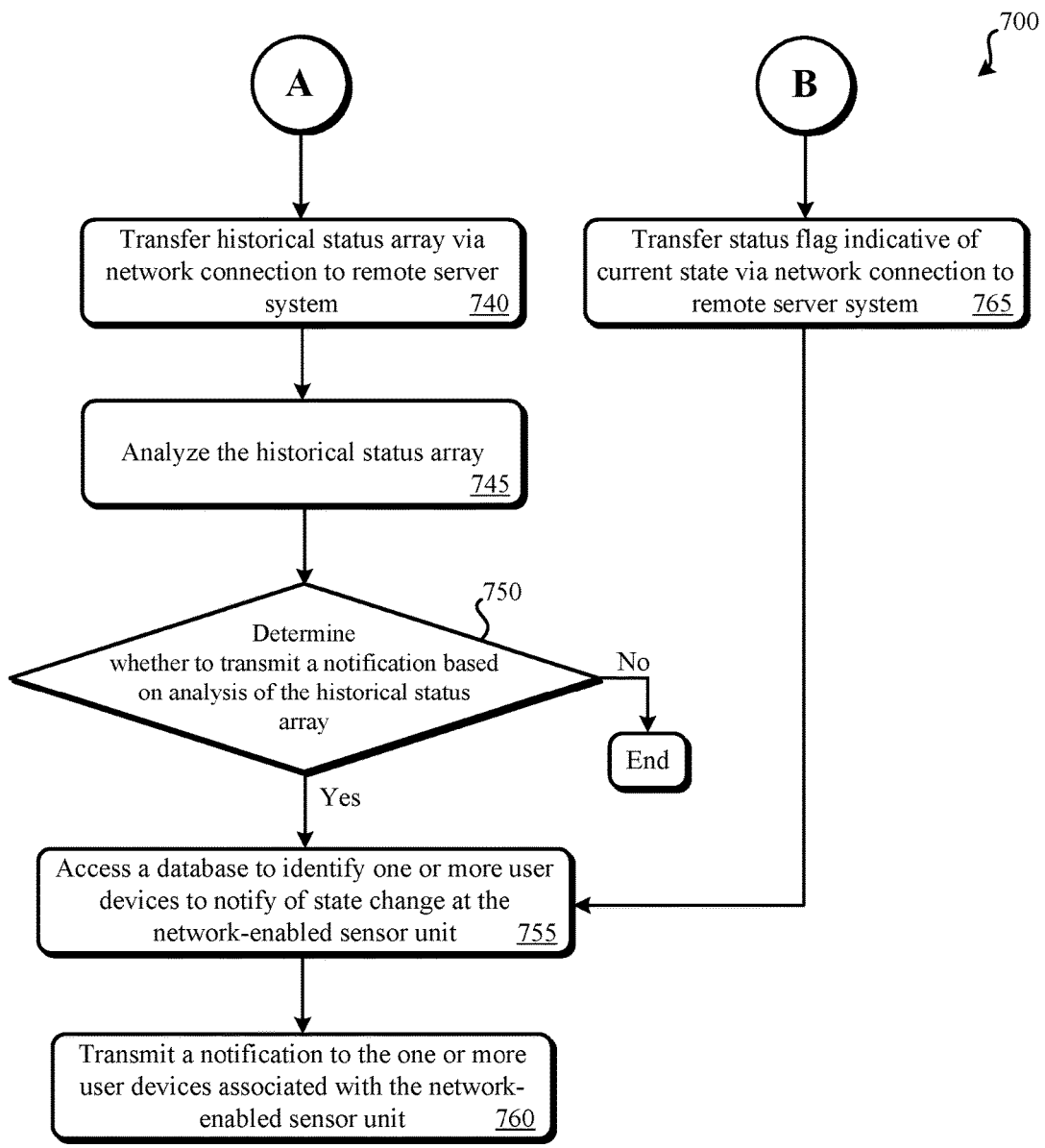

FIGS. 7A and 7B illustrates an embodiment of a method 700 for handling a delayed status update. Blocks of method 700 may be performed by an embodiment of wireless device (e.g., wireless device 110 of FIG. 1 or wireless sensor unit 210 of FIG. 2) or notification service system (e.g., notification service system 120 and 220 of FIGS. 1 and 2, respectively). Method 700 can represent a more detailed embodiment of method 600 of FIG. 6.

At block 705, measurements of one or more environmental conditions may be performed using one or more environmental sensors of the wireless sensor unit. In some embodiments, the environmental conditions measured include smoke and/or CO. At block 710, the wireless sensor unit may determine that a status has changed from a first state (e.g., a standby state) to a second state (e.g., heads-up, warning, or alarm). This state change from the first state to the second state may be triggered based on one or more measurements that are taken by one or more sensors that are part of the wireless device exceeding a defined threshold and, possibly, exceeding the threshold for at least a period of time. In some embodiments, the status is changed based on smoke, carbon monoxide, and/or occupancy measurements. Alternatively, in some embodiments, the status may change from the first state to the second state based on a condition occurring other than one or more measurements being performed using a sensor.

In response to determining that the environmental condition has changed from the first state to a second state, a historical status array stored by the wireless sensor unit may first be cleared; then an entry may be written to the historical status array at block 715 indicative of the state change of the status, a timestamp at which the state change occurred, and an indication of whether the state has been synchronized to the notification service system. The historical status array may resemble the table of FIG. 3A. Any further changes that occur to the state of the status may be written to the historical status array as additional entries. The array, which may be in the form of a table, may store a maximum number of entries, such as four.

At block 720, in response to determining the status has changed from the first state to the second state at block 710, a network connection may be established with the notification service system. Referring to FIG. 2, wireless sensor unit 210 may establish a communication link with notification service system 220 through router/access point 245 and network 240 (which includes, at least, the Internet). Establishment at block 720 of the network connection may take a substantial amount of time as detailed in relation to block 520.

At block 725, after the network connection has been established with the notification service system at block 720, the wireless sensor unit may determine whether the environmental condition status determined to have changed has reverted to the first state. As such, the determination made at block 725 is indicative of the environmental condition status having reverted to the first state prior to the wireless sensor unit being able to update a remote status stored by the notification service system. This condition may be determined at the wireless sensor unit by the historical status array having entries that precede a transition back to the first state that have yet to be synchronized with the notification service system. Between block 710 and block 725, zero or more than one state change (in addition to the state change of block 710) may have occurred. Alternatively, rather than determining that the environmental condition status has reverted to the first state, at block 725 the wireless sensor unit may determine that the environmental condition status has changed to a third status.

Method 700 may proceed to block 730 if the wireless sensor unit determines that the environmental condition status has reverted to the first state (or, possibly, transitioned to a third state) prior to being able to communicate with the notification services system and provide a current status that is other than the first state (e.g., standby). At block 730, a comparison between an amount of time that has elapsed since the wireless sensor unit's status transitioned back to standby (or another first or third state) and a predefined threshold time period is performed. The predefined threshold time period may be stored locally by the wireless sensor device or may be retrieved from a field stored by the notification service system. The predefined threshold time period may vary based on the type of status. For example, different time periods may be set, either at the wireless sensor unit or at the notification service system, for smoke, CO, and/or another environmental condition that is monitored by the wireless sensor unit.

If, at block 730, the comparison indicates that the elapsed amount of time that has elapsed since the reversion to the first state is greater than the predefined threshold time duration (the elapsed time exceeds the threshold), method 700 may revert to block 705. As such, since the time period was exceeded, no notification is sent to the user, and the wireless sensor unit continues to monitor the one or more environmental conditions. As such, a user may never be made aware that the wireless sensor unit changed from the first state to another state unless the user was in the vicinity of the wireless sensor unit during the transition and a visual and/or auditory indication was output by the wireless sensor unit. It should be understood that throughout method 700, the wireless sensor unit can continue to monitor the one or more environmental conditions regardless of the interactions with the notification service system, as one of the primary functions of the wireless sensor unit may be to output a local visual and/or auditory alarm if smoke, CO, and/or some other environmental condition reaches a dangerous level.

If, at block 730, the comparison indicates that the elapsed amount of time that has elapsed since the reversion to the first state is less than the predefined threshold time duration (the elapsed time is below the threshold), method 700 may continue to block 740 on FIG. 7B. At block 740, the historical status array, which would contain at least two entries (a transition away from the first state and a transition back to the first state), is transferred to the notification service system via the network connection. Additional transitions may also be present, such as if the sensor unit transitioned from the first to a second state, the second to a third state, then the third to the first state. The notification service system may store this data in relation to an array of remotely stored data for the wireless sensor unit. In addition, at block 740, the wireless sensor unit may provide an indication to the notification service system that the historical status array has been provided; for example, in the array of remotely stored data, the wireless sensor unit may toggle a bit or set a flag that corresponds to the historical status array. Alternatively, the notification service system may be able to detect the historical status array based on the wireless sensor unit performing a write function to the variable that stores the historical status array at the notification service system.

At block 745, the historical status array may be analyzed by the notification service system. The notification service system may be triggered to analyze the historical status array based on: the historical status array having been transferred to the notification service system or a flag or toggle bit having been set by the wireless sensor unit at the notification service system to inform the notification service system that the historical status array has been uploaded and is up-to-date. That is, the notification service system may store a historical status array for each wireless device for which it provides notifications, and may require that an indication be provided when such an associated historical status array should be parsed or otherwise analyzed. The analysis at block 745 may determine, at least: 1) whether the most recent status set at the wireless sensor unit, based on a timestamp, is a standby state, and; 2) if one or more previous states are listed in the array that have not previously been synchronized with the notification service system.

Based on the analysis of block 745, at block 750 a determination may be made as to whether a notification should be transmitted to a user via a user device that is indicative of the environmental condition that led to the transitions away from (and, possibly, reverting to) the first state. If, based on the analysis of claim block 750, the determination is no, no further action by the notification service system may be taken.

If, based on the analysis of claim block 750, the determination is that yes, a notification should be transmitted, method 700 may proceed to block 755. At block 755, a database may be accessed to determine one or more users and/or user devices that should receive the notification. The wireless sensor unit may have provided an identifier that is unique from identifiers of other wireless sensor units, thus allowing the notification service system to determine the particular wireless sensor unit from which data was received. Such an identifier may have been provided to the notification service system at block 740. Using this identifier, the notification service system may look up an address, email address, or other identifier that can be used as an address to which the notification is to be sent.

At block 760, the notification may be transmitted to one or more user devices associated with the wireless sensor unit. The content of the notification that is transmitted may be based on the analysis of the historical status array performed at block 745. The notification may also be indicative of the type of environmental condition that triggered the notification, such as smoke or CO. In some embodiments, the notification is sent to one or more user devices based on the database look-up of block 755 associated with the user as a push notification. This push notification may cause a message to be presented as a pop-up or banner on the user device.

If, at block 725 of FIG. 7A, it is determined that the environmental condition status has not reverted to the first state of standby, method 700 may proceed to block 765 on FIG. 7B. At block 765, state data indicative of the current status of the wireless sensor unit may be transferred via the network connection to the notification service system. Block 765 can be in lieu of transmission of the historical status array from being transmitted to the notification service system. That is, if the "no" path is followed from block 725, the historical status array may not be transmitted from the wireless sensor device to the notification service system and may be eventually deleted or otherwise discarded by the wireless sensor unit such as when the wireless sensor unit transitions from the first state to another state at some time in the future. Following block 725, method 700 may proceed to block 755 and block 760, at which a notification indicative of the current state of the wireless sensor unit may be sent to one or more user devices associated with the wireless sensor unit. Since the notification is indicative of a current status and not a retroactive status, the notification can make clear that the state of the wireless sensor unit is current, such as by a message stating: "Smoke is present in the kitchen." or "A carbon monoxide alarm is present in the basement."

Figure 8:
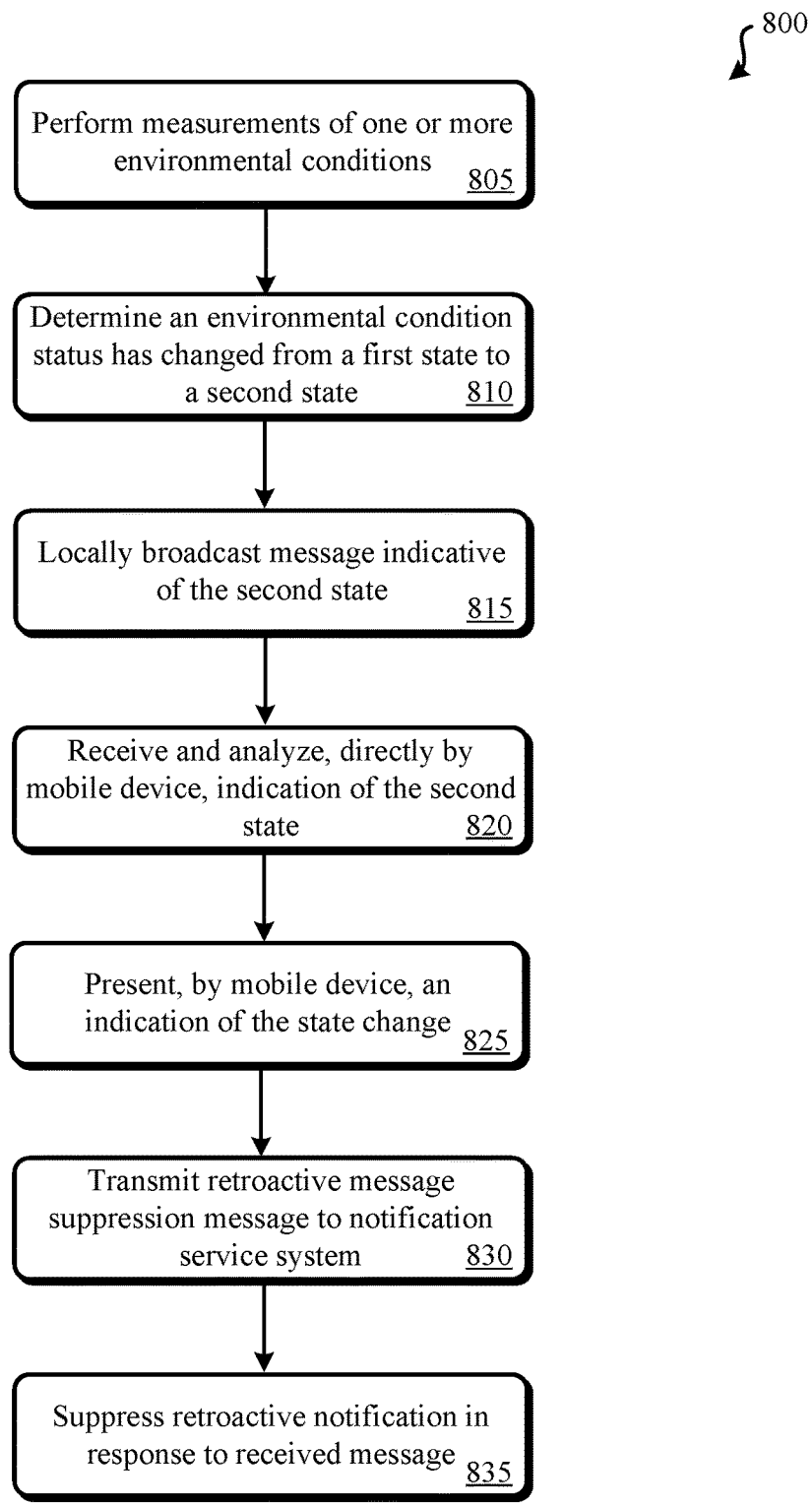
FIG. 8 illustrates an embodiment of a method for suppressing delayed status updates in response to a direct-to-mobile notification being delivered.

FIG. 8 illustrates an embodiment of a method 800 for suppressing delayed status updates in response to a direct-to-mobile notification being delivered by the wireless sensor unit. Method 800 may be performed using system 200 of FIG. 2. Method 800 may be performed in conjunction with methods 500, 600, and 700. Therefore, blocks of method 800 may be performed interspersed with blocks or method 500, 600, and 700.

As previously detailed, at block 810, measurements of one or more environmental conditions may be performed using one or more environmental sensors of the wireless sensor unit. In some embodiments, the environmental conditions measured include smoke and CO. At block 820, the wireless sensor unit may determine that a status has changed from a first state (e.g., a standby state) to a second state (e.g., heads-up, warning, or alarm) based on the measurements of block 805. This state change from the first state to the second state may be triggered based on one or more measurements that are taken by one or more sensors that are part of the wireless device exceeding a defined threshold and, possibly, exceeding the threshold for at least a period of time. In some embodiments, the status is changed based on smoke, carbon monoxide, and/or occupancy measurements. Alternatively, in some embodiments, the status may change from the first state to the second state based on a condition occurring other than one or more measurements being performed using a sensor.

In response to block 810, the wireless sensor unit may broadcast or otherwise transmit a message indicative of the second state. If broadcast, the wireless sensor unit may not be able to determine whether or not the broadcast was received a mobile device of the user and, as such, may be unable to assess whether a notification to the user via the mobile should be routed through a notification service system. In some embodiments, Bluetooth® or Bluetooth Low Energy® (BLE) is used to broadcast the state of the wireless sensor unit.

At block 820, a mobile device of the user may receive the broadcast. The mobile device may only analyze or otherwise process the broadcast of block 815 if the mobile device is executing an application that is configured to monitor for such wireless broadcasts. In other embodiments, the mobile device may be configured to monitor for such broadcasts even if an application associated with the wireless sensor unit is not being executed by the mobile device.

At block 825, if the application is being executed and the broadcast is successfully received and processed, a notification indicative of the state change from block 810 may be presented or otherwise output by the mobile device. The application or mobile device may store an indication that the notification has been output by the mobile device and/or that a user has acknowledged the notification based on dismissing or otherwise clearing the notification.

At block 830, in response to the notification being analyzed at block 820, the notification being output at block 825, and/or the notification being dismissed or otherwise cleared by a user at the mobile device, the mobile device may transmit a message to the notification service system that suppresses the notification service system from transmitting notifications to the mobile device, such as for a period of time. The mobile device may use any available communication path to communicate with the notification service system, such as via a local router/access point or a cellular network.

In response to receiving the suppression message at block 830, the notification service system may store an indication of the suppression message in conjunction with a database entry corresponding to the wireless sensor unit at block 835. The presence of an active suppression for the wireless sensor unit may prevent the notification service system from sending a notification based on an analysis of the historical status array. Referring to block 750 of FIG. 7B, if a flag or field for a received suppression message associated with the historical status array is active, the determination of block 750 may be that no notification should be sent, regardless of the content of the historical status array. In other embodiments, referring to block 745, if a flag or field for a received suppression message associated with the historical status array is active, the historical status array may not be analyzed and method 700 may proceed to the "no" determination associated with block 750. As previously noted, method 800 may also be performed in conjunction with methods 500 and 600. After a period of time the mobile device may transmit a subsequent message to the notification service system that enables delayed notifications or, the flag or field set at the notification service system may time out and be reset by the notification service system (without a subsequent message from the mobile device) after a defined period of time.

Figure 10:
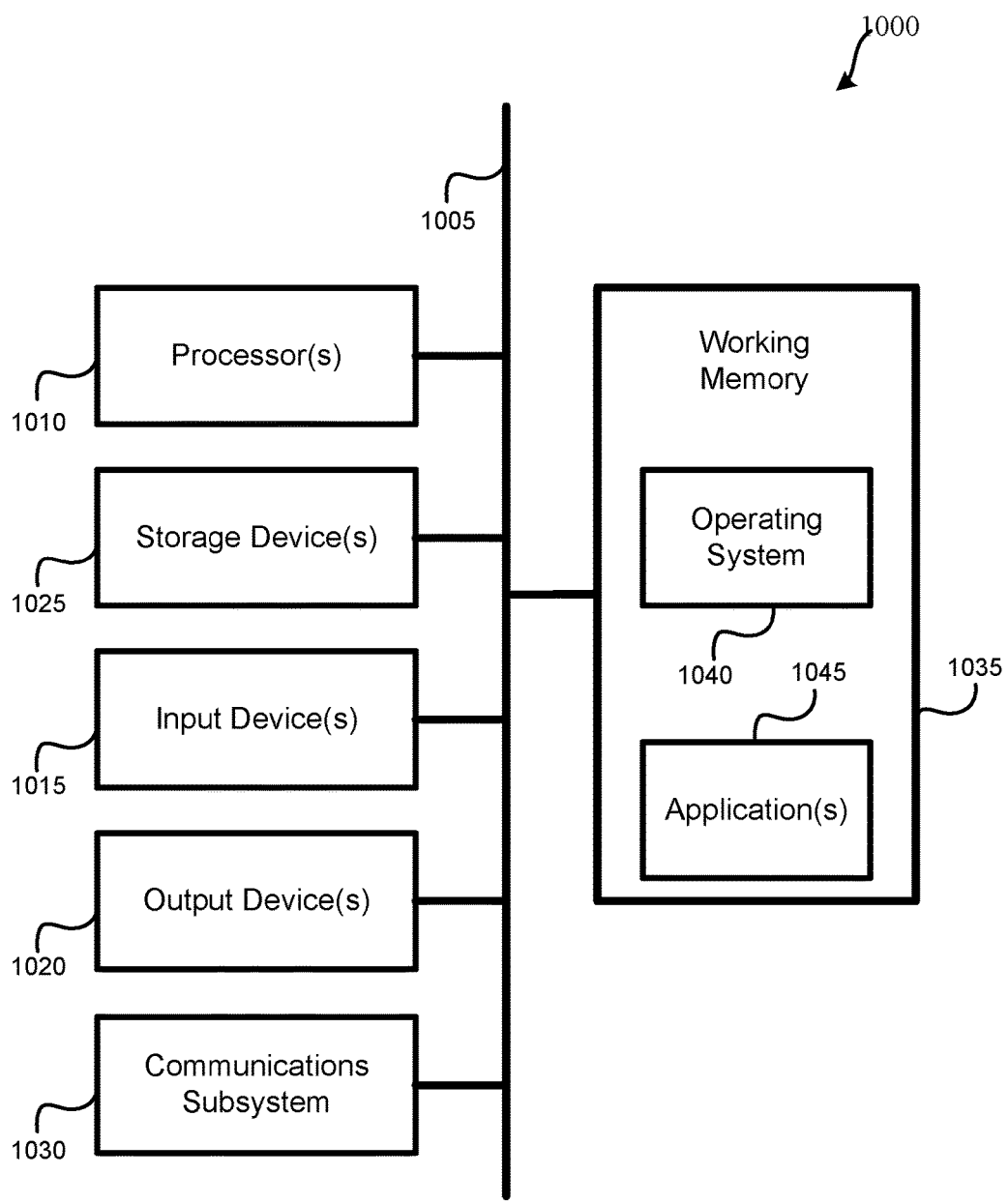
FIG. 10 illustrates an embodiment of a computer system that can be incorporated as part of the network-enabled devices and notification service system.

FIG. 10 illustrates an embodiment of a computer system 1000 that can be incorporated as part of the wireless devices, wireless sensor units, user devices, notification service systems, and push notification services detailed in relation to FIGS. 1-7B. FIG. 10 provides a schematic illustration of one embodiment of a computer system 1000 that can perform various steps of the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication). The hardware elements may include one or more processors 1010, including without limitation one or more general-purpose processors and/or one or more special-purpose processors (such as digital signal processing chips, graphics acceleration processors, video decoders, and/or the like); one or more input devices 1015, which can include without limitation a mouse, a touchscreen, keyboard, remote control, and/or the like; and one or more output devices 1020, which can include without limitation a display device, a printer, etc.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the non-transitory storage device(s) 1025. Merely by way of example, execution of the sequences of instructions contained in the working memory 1035 might cause the processor(s) 1010 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

It should further be understood that the components of computer system 1000 can be distributed across a network. For example, some processing may be performed in one location using a first processor while other processing may be performed by another processor remote from the first processor. Other components of computer system 1000 may be similarly distributed. As such, computer system 1000 may be interpreted as a distributed computing system that performs processing in multiple locations. In some instances, computer system 1000 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the embodiments. Also, a number of steps may be undertaken before, during, or after the above elements are considered.

What is claimed is:

1. A method for handling a delayed status update, the method comprising:
    measuring, by a network-enabled sensor unit, an environmental condition;
    determining, by the network-enabled sensor unit, based on measuring the environmental condition, an environmental condition status has changed from a first state to a second state;
    establishing a network connection that permits communication with a notification service system in response to determining the environmental condition status has changed, wherein
        the notification service system maintains a remote environmental condition status to be synchronized with the environmental condition status of the network-enabled sensor unit;
    determining, by the network-enabled sensor unit, the environmental condition status has reverted to the first state prior to communicating the environmental condition status to the notification service system via the established network connection; and
    transmitting, by the network-enabled sensor unit, a historical status array to the notification service system via the established network connection in response to determining the environmental condition status has reverted to the first state prior to communicating the environmental condition status to the notification service system, wherein:
        the historical status array indicates one or more previous states of the environmental condition status of the network-enabled sensor unit; and
        the remote environmental condition status remains unchanged at the notification service system.

2. The method for handling the delayed status update of claim 1, further comprising:
    determining, by the network-enabled sensor unit, an amount of time that has elapsed between determining the environmental condition status has changed from the first state to the second state and the network connection being established; and
    comparing, by the network-enabled sensor unit, the determined amount of time with a stored threshold amount of time; wherein:
        transmitting the historical status array to the notification service system is contingent on the determined amount of time not exceeding the stored threshold amount of time.

3. The method for handling the delayed status update of claim 1, further comprising parsing, by the notification service system, the transmitted historical status array to analyze the one or more previous states of the environmental condition status of the network-enabled sensor unit.

4. The method for handling the delayed status update of claim 3, further comprising:
    determining, by the notification service system, based on parsing the historical status array, to transmit a user notification indicative of the environmental condition;
    accessing, by the notification service system, a database that links a user device with the network-enabled sensor unit; and
    causing, by the notification service system, a notification to be transmitted to the user device indicative of the environmental condition.

5. The method for handling the delayed status update of claim 4, wherein the notification is a push notification and the user device is a cellular telephone, the push notification being transmitted to the user device without a request having been sent from the user device to the notification service system.

6. The method for handling the delayed status update of claim 3, further comprising:
broadcasting, by the network-enabled sensor unit, a message indicative of the second state via a local wireless communication protocol distinct from a protocol used for the network connection.

7. The method for handling the delayed status update of claim 6, further comprising:
receiving, by the notification service system, a suppression message from a user device associated with the network-enabled sensor unit; and
in response to the suppression message, suppressing transmission of a notification to the user device based on parsing of the historical status array.

8. The method for handling the delayed status update of claim 1, wherein the environmental condition that is measured is an amount of smoke or an amount of carbon monoxide.

9. The method for handling the delayed status update of claim 1, wherein the network-enabled sensor unit is exclusively battery powered.

10. The method for handling the delayed status update of claim 1, further comprising:
periodically establishing, by the network-enabled sensor unit, the network connection that permits communication with the notification service system absent the environmental condition status changing.

11. A system for handling a delayed status update, the system comprising:
a network-enabled wireless unit, comprising:
a wireless network interface;
one or more processors; and
a memory communicatively coupled with and readable by the one or more processors and having stored therein processor-readable instructions which, when executed by the one or more processors, cause the one or more processors to:
determine a local status has changed from a first state to a second state, wherein the local status is maintained at the network-enabled wireless unit;
establish a network connection that permits communication with a notification service system in response to determining the local status has changed, wherein the notification service system maintains a remote status to be synchronized with the local status of the network-enabled wireless unit,
determine the local status has changed prior to synchronization with the notification service system via the established network connection; and
transfer, via the wireless network interface and the established network connection, a historical status array to the notification service system in response to determining the local status has changed prior to synchronization, wherein:
the historical status array indicates one or more previous states of the local status of the network-enabled wireless unit; and
the remote status remains unchanged at the notification service system.

12. The system for handling the delayed status update of claim 11, further comprising:
the notification service system accessible by the network-enabled wireless unit via the network connection, the notification service system configured to:
determine, based on parsing the historical status array, to transmit a user notification indicative of the second state;
access a database that links a user device with the network-enabled wireless unit; and
transmit a notification to the user device indicative of the second state.

13. The system for handling the delayed status update of claim 11, further comprising:
the notification service system accessible by the network-enabled wireless unit via the network connection, the notification service system configured to:
process a received suppression message from a user device associated with the network-enabled wireless unit; and
in response to the received suppression message, suppress transmission of a notification to the user device based on an analysis of the historical status array.

14. The system for handling the delayed status update of claim 13, wherein the network-enabled wireless unit further comprises a local direct wireless communication interface distinct from the wireless network interface, the processor-readable instructions, when executed by the one or more processors, cause the one or more processors to:
broadcast, via the local direct wireless communication interface, a message indicative of the second state.

15. The system for handling the delayed status update of claim 14, further comprising: a mobile device, the mobile device configured to:
receive and process the broadcast message indicative of the second state, the broadcast message being received directly from the network-enabled wireless unit;
in response to the processed broadcast message, present an indication of the second state; and
in response to the processed broadcast message, transmit a suppression message to the notification service system, wherein the suppression message instructs the notification service system to suppress notifying the user device.

16. The system for handling the delayed status update of claim 11, wherein the network-enabled wireless unit comprises an environmental sensor that measures an environmental condition and the local status is based on measurements made by the environmental sensor and the environmental condition is an amount of smoke or carbon monoxide.

17. The system for handling the delayed status update of claim 11, the network-enabled wireless unit further comprising a power supply, the power supply providing power to components of the network-enabled wireless unit exclusively from one or more batteries.

18. The system for handling the delayed status update of claim 11, wherein the processor-readable instructions of the network-enabled wireless unit, when executed by the one or more processors, cause the one or more processors to:
determine an amount of time that has elapsed between determining the local status has changed from the first state to the second state and the network connection being established; and
compare the determined amount of time with a stored threshold amount of time; wherein:

transmitting the historical status array to the notification service system is contingent on the determined amount of time not exceeding the stored threshold amount of time.

19. A non-transitory processor-readable medium comprising processor-readable instructions that cause one or more processors to:
   determine a local status has changed from a first state to a second state based on measurements from one or more environmental sensors;
   establish a network connection that permits communication with a notification service system in response to determining the local status has changed, wherein the notification service system maintains a remote status to be synchronized with the local status;
   determine the local status has reverted to the first state following the network connection being established but prior to synchronization with the notification service system; and
   transfer, via a wireless network interface, a historical status array to the notification service system in response to determining the local status has reverted to the first state prior to synchronization, wherein the remote status remains unchanged at the notification service system due to the local status having reverted to the first state prior to synchronization.

20. The non-transitory processor-readable medium of claim 19, wherein the processor-readable instructions, when executed by the one or more processors, cause the one or more processors to:
   determine an amount of time that has elapsed between determining the local status has changed from the first state to the second state and the network connection being established; and
   compare the determined amount of time with a stored threshold amount of time; wherein:
      transmitting the historical status array to the notification service system is contingent on the determined amount of time not exceeding the stored threshold amount of time.

* * * * *